United States Patent
Lee et al.

(10) Patent No.: US 10,325,196 B2
(45) Date of Patent: Jun. 18, 2019

(54) SMART TAG AND SMART TAG SYSTEM USING THE SAME

(71) Applicants: HYUNDAI MOTOR COMPANY, Seoul (KR); KIA MOTORS COPORATION, Seoul (KR)

(72) Inventors: Sung Wook Lee, Seoul (KR); Hyeoung Kim, Suwon-si (KR); Deug Young So, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/826,440

(22) Filed: Nov. 29, 2017

(65) Prior Publication Data

US 2018/0268279 A1 Sep. 20, 2018

(30) Foreign Application Priority Data

Mar. 15, 2017 (KR) ........................ 10-2017-0032401

(51) Int. Cl.
*G06K 7/08* (2006.01)
*G06K 19/077* (2006.01)
*G06K 19/07* (2006.01)

(52) U.S. Cl.
CPC ... *G06K 19/07758* (2013.01); *G06K 19/0702* (2013.01); *G06K 19/0716* (2013.01)

(58) Field of Classification Search
CPC .................. G06K 19/007758; G06K 19/0702
USPC ........ 235/451, 380, 375, 487, 492, 383, 384
See application file for complete search history.

(56) References Cited

U.S. PATENT DOCUMENTS

| | | | |
|---|---|---|---|
| 2002/0198618 A1* | 12/2002 | Madden | B62D 65/02 700/101 |
| 2008/0045274 A1* | 2/2008 | Witkowski | G07C 5/008 455/569.2 |
| 2016/0252898 A1* | 9/2016 | Sahadeo | G05B 19/4183 700/116 |

FOREIGN PATENT DOCUMENTS

| KR | 10-1416373 B1 | 7/2014 |
| KR | 10-1509753 B1 | 4/2015 |
| KR | 10-2016-0103376 A | 9/2016 |

* cited by examiner

*Primary Examiner* — Karl D Frech
(74) *Attorney, Agent, or Firm* — Knobbe Martens Olson & Bear LLP

(57) ABSTRACT

A smart tag is attached on a vehicle body in a vehicle manufacturing process. The smart tag includes a position measurement transmitter for transmitting signals for measuring position of a vehicle body, a wireless communication transceiver for performing wireless communication, a position sensor for sensing data for calculating a position of the vehicle body, a memory for storing data including vehicle body information, a controller for controlling operation of the smart tag, and a battery for supplying electric power to components of the smart tag.

16 Claims, 4 Drawing Sheets

SMART TAG AND SMART TAG SYSTEM USING THE SAME

CROSS-REFERENCE TO RELATED APPLICATION

This application claims priority to and the benefit of Korean Patent Application No. 10-2017-0032401 filed in the Korean Intellectual Property Office on Mar. 15, 2017, the entire contents of which are incorporated herein by reference.

BACKGROUND

(a) Field

The present disclosure relates to a smart tag and a smart tag system applicable to a manufacturing line of a vehicle.

(b) Description of Related Art

Majority of processes of vehicle manufacturing are assembly processes where parts of the vehicle are assembled to a vehicle body.

The assembly process affects to a quality of the vehicle e.g., in ride quality and durability, and precise management of the assembly process is an important factor in manufacturing a vehicle.

In order to precisely manage an assembly process, workers or machines working on a vehicle should precisely comprehend what specific work should be done to the vehicle moving into a workspace. For such a purpose, barcodes or passive RFID tags are typically used. However, such a system employs a large number of parts in the workspace and shows a low precision on detecting position of the vehicle body.

The above information disclosed in this Background section is only for enhancement of understanding of the background of the invention. Applicant notes that this section may contain information available before this application. However, by providing this section, Applicant does not admit that any information contained in this section constitutes prior art.

SUMMARY

The present disclosure relates to a smart tag and a smart tag system for manufacturing a vehicle that provides more precise control of entrance and position of a vehicle body and better management of process information.

A smart tag system for a manufacturing a vehicle may include a smart tag storing vehicle body information and attached to a vehicle body, a main transceiver wirelessly communicating with the smart tag, and a server communicating with the smart tag through the main transceiver. The smart tag may include a position measurement transmitter transmitting a signal used for measurement of a vehicle body position, a wireless communication transceiver performing wireless communication with the main transceiver, a position sensor for sensing data for calculating a position of the vehicle body, a memory storing data including vehicle body information, a controller for controlling an operation of the smart tag, and a battery for supplying electric power to components of the smart tag.

The server may calculate the vehicle body position based on the signal transmitted from the position measurement transmitter.

The smart tag may determine whether the vehicle body has entered a predetermined workspace based on information received from the server or based on data obtained by the position sensor.

The controller may store and update the vehicle body position in the memory.

The smart tag may send vehicle body information to the server, the server may send process information corresponding to the vehicle body information, and the controller may store the received process information in the memory.

The server may send process result information to the smart tag, and the smart tag stores the process result information in the memory.

The smart tag may send specification information of the vehicle body to the server.

The memory may store position information of the vehicle body, vehicle body code information, specification information of parts to be assembled, fastening torque information for parts to be assembled, fluid quantity information to be inserted or actually inserted into the vehicle, and inspection result information.

The fluid may include engine oil, transmission oil, brake fluid, steering oil, coolant, or washer liquid.

The position sensor may be an acceleration sensor that detects acceleration of a movement of the vehicle body.

The smart tag may calculate the position of the vehicle body based on data received from the acceleration sensor.

When the server does not respond upon a request for vehicle body position information, the controller may use the position of the vehicle body calculated by the position sensor as the vehicle body position.

The smart tag may further include a state display for displaying an operating state of the smart tag by turning on or off or by a displayed color.

An smart tag attachable on a vehicle body in a manufacturing process may include a position measurement transmitter transmitting a signal used for measurement of a vehicle body position, a wireless communication transceiver performing wireless communication, a position sensor for sensing data for calculating a position of the vehicle body, a memory storing data including vehicle body information, a controller for controlling an operation of the smart tag, and a battery for supplying electric power to components of the smart tag.

The memory may store position information of the vehicle body, vehicle body code information, specification information of parts to be assembled, fastening torque information for parts to be assembled, fluid quantity information to be inserted or actually inserted into the vehicle, and inspection result information.

The position sensor may be an acceleration sensor that detects acceleration of a movement of the vehicle body.

The controller may calculate the position of the vehicle body based on data received from the acceleration sensor.

A smart tag may further include a state display for displaying an operating state of the smart tag by turning on or off or by a displayed color.

According to an embodiment, vehicle information including process result information of previous processes are stored in the smart tag that is attached to and moved with vehicle body, and thus always the process data may be better managed.

The vehicle body position may be precisely conceived by the server by communicating with the smart tag, and thus assembly processes may be more precisely performed.

The smart tag may also calculate by using an installed position sensor, and thus reducing malfunctioning of determining whether the vehicle body has entered a predetermined workspace.

DETAILED DESCRIPTION

Figure 1:
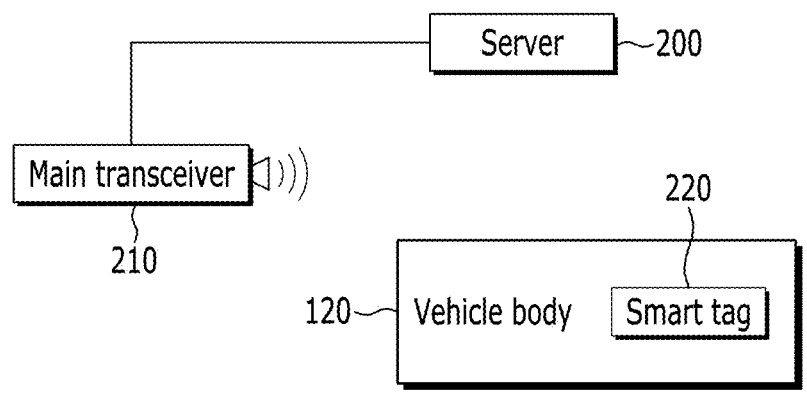
FIG. 1 is a schematic diagram of a smart tag system according to an embodiment of the present invention.

Hereinafter, embodiments of the present invention will be described in detail with reference to drawings.

The size and the thickness of each component illustrated in the drawings are arbitrarily illustrated in the drawings for better understanding and ease of description, but the present invention is not limited to the illustration. In the drawings, the thicknesses of various portions and regions are enlarged for clarity.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

According to an aspect of the invention, a method for providing information to workers during vehicle manufacturing using a smart tag attached to an unfinished vehicle (or vehicle body). During vehicle manufacturing, a smart tag is attached to an unfinished vehicle.

In embodiments, while being attached to the unfinished vehicle, the smart tag determines position of the unfinished vehicle within the manufacturing facility or factory, and transmits the position to the server. Upon receiving the position, the server pulls information about a process to be performed at a work station corresponding to the position. The server transmits information to be displayed on a display fixed at the work station to the smart tag and/or to the fixed display.

In embodiments, the smart tag (1) obtains processing schedule for a unfinished vehicle via wireless communication with the server (2) identifies a process scheduled for the unfinished vehicle at a work station corresponding to a current position of the unfinished vehicle, and (3) communicates with a fixed display of the work station to cause the fixed display to display at least one parameter of the scheduled process for a worker of the work station. In embodiments, prior to a process for an unfinished vehicle, initialization of the smart tag is performed to save, on a memory of the smart tag, identification of the particular unfinished vehicle body and information of scheduled processes.

In embodiments, the smart tag determines position of the particular vehicle body using information from the server or using its own position sensor. When it is determined that the vehicle body is moved to a workplace for a particular process, the smart tag transmits the vehicle body's position (and/or identification of the particular vehicle body) to obtain at least one parameter of the particular process from the server (or a database connected to the server). In embodiments, the at least one parameter is stored on the smart tag during initialization of the smart tag.

In embodiments, after obtaining at least one parameter of the particular process, the smart tag displays the at least one parameter on its own display when the vehicle body is moving to or is located at the workplace. In embodiments, the smart tag communicates with a fixed display of a workplace where the particular vehicle body is moving to or located at the workplace such that the fixed display can display the at least one parameter of the particular process of the workplace. In embodiments, the smart tag and the fixed display are synchronized to display the same parameter(s) of the particular process at the same time such that workers of the workplace can confirm, verify process parameters for the particular vehicle body.

FIG. 1 is a schematic diagram of a smart tag system according to an embodiment of the present invention.

Referring to FIG. 1, a smart tag system according to an embodiment of the present invention includes a server 200, a main transceiver 210, a vehicle body 120 under manufacturing, and a smart tag 220.

The smart tag 220 is attached to the vehicle body 120. The main transceiver 210 is located to a workspace for a predetermined process, which may be assemble, inspection, repair, etc., and communicate with the smart tag 220 and the server 200.

The server 200 may be server for controlling a manufacturing process under entry of a vehicle body. Such a server 200 may be realized as a typical computer server.

Figure 2:
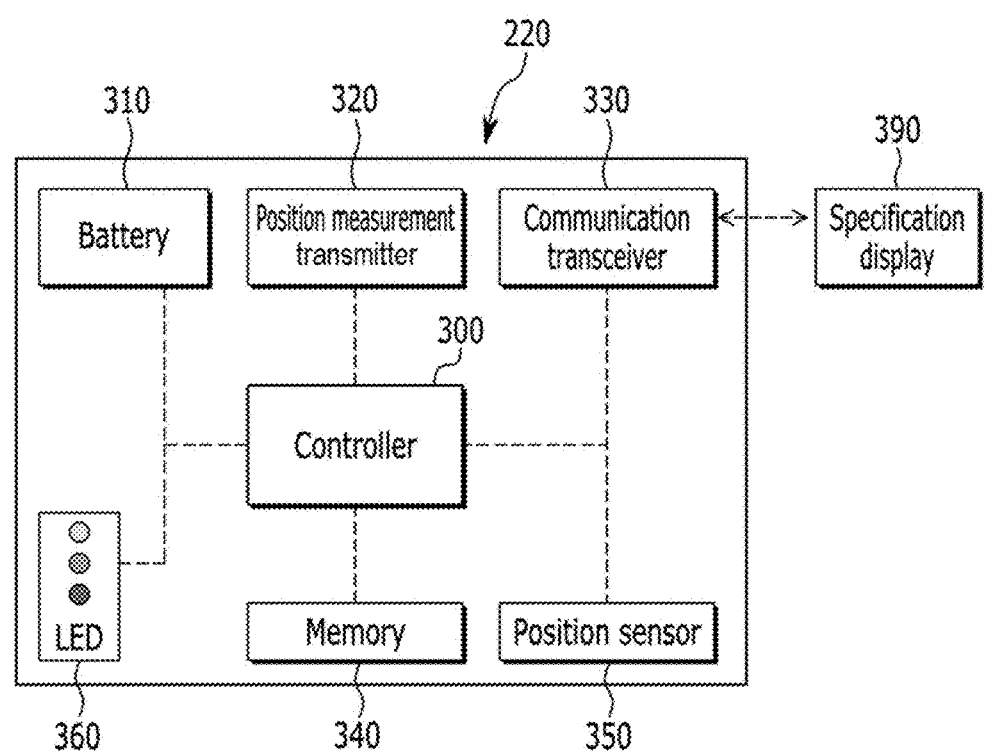
FIG. 2 is a schematic diagram of a smart tag according to an embodiment of the present invention.

FIG. 2 is a schematic diagram of a smart tag according to an embodiment of the present invention.

Referring to FIG. 2, the smart tag 220 includes a battery 310, a position measurement transmitter 320, a wireless communication transceiver 330, a controller 300, a memory 340, a position sensor 350, and a state display 360.

A smart tag system according to an embodiment may further include a specification display 390 as shown in FIG. 2.

The specification display 390 displays various information and specification applicable to the vehicle body 120, such that workers may work referring to information displayed on the display 390. The specification display 390 communicates with the wireless communication transceiver 330. FIG. 2 illustrates that the specification display 390 independently communicate with the smart tag 220, however, it may be understood that the specification display 390 is linked with the main transceiver 210 so as to communicate data with the smart tag 220 through the main transceiver 210.

The position measurement transmitter 320 and the wireless communication transceiver 330 may act in a UWB (ultra-wideband) scheme. The battery 310 supplies electric power to components of the smart tag 220, and may be recharged by an external power source.

The position measurement transmitter 320 transmits a predetermined wireless signal, and the main transceiver 210 detects strength of the signal and sends the detected signal information to the server 200. The server 200 may calculate a position of the vehicle body 120 attached with the smart tag 220 based on the signal strength, since the vehicle body 120 is typically moved along a predetermined path.

The wireless communication transceiver 330 communicates with the main transceiver 210 in a wireless format. The controller 300 processes information received from the main transceiver 210 and stores the information in the memory 340.

The position sensor 350 may be a physical sensor, e.g., an acceleration sensor. When the position sensor 350 is an acceleration sensor, and an initial position, e.g., a position of a previous workspace, may be set to 0 and a current position may be calculated based on the acceleration information obtained by the position sensor 350.

The controller 300 may also send position information of the smart tag 220 obtained by the position sensor 350 to the server 200 through the wireless communication transceiver 330 and the main transceiver 210.

The controller 300 controls components of the smart tag 220, stores and updates information in the memory 340, and determines an operating state the smart tag 220.

The state display 360 includes an LED light source, and may display an operating state of the smart tag 220 by turning on or off of the light source or by turning on different colors of the light source.

The server 200 and the controller 300 each may be realized as at least one microprocessor programmed with a predetermined program, and the predetermined program may include a set of instructions for performing a method according to an embodiment of the present invention.

Figure 3:
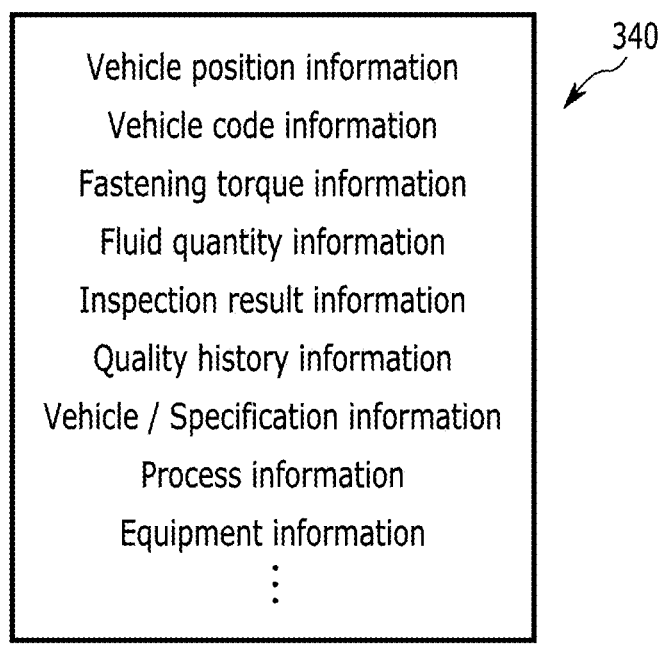
FIG. 3 illustrates an example of information stored in a memory of a smart tag according to an embodiment of the present invention.

FIG. 3 illustrates an example of information stored in a memory of a smart tag according to an embodiment of the present invention.

Referring to FIG. 3, the memory 340 of the smart tag 220 may store various kinds of information, e.g., position information of the vehicle body 120, vehicle body code information, fastening torque information for parts to be assembled, fluid quantity information to be inserted or actually inserted into the vehicle, inspection result information, quality history information, vehicle and specification information, process information, and assembly equipment information, etc.

Figure 4:
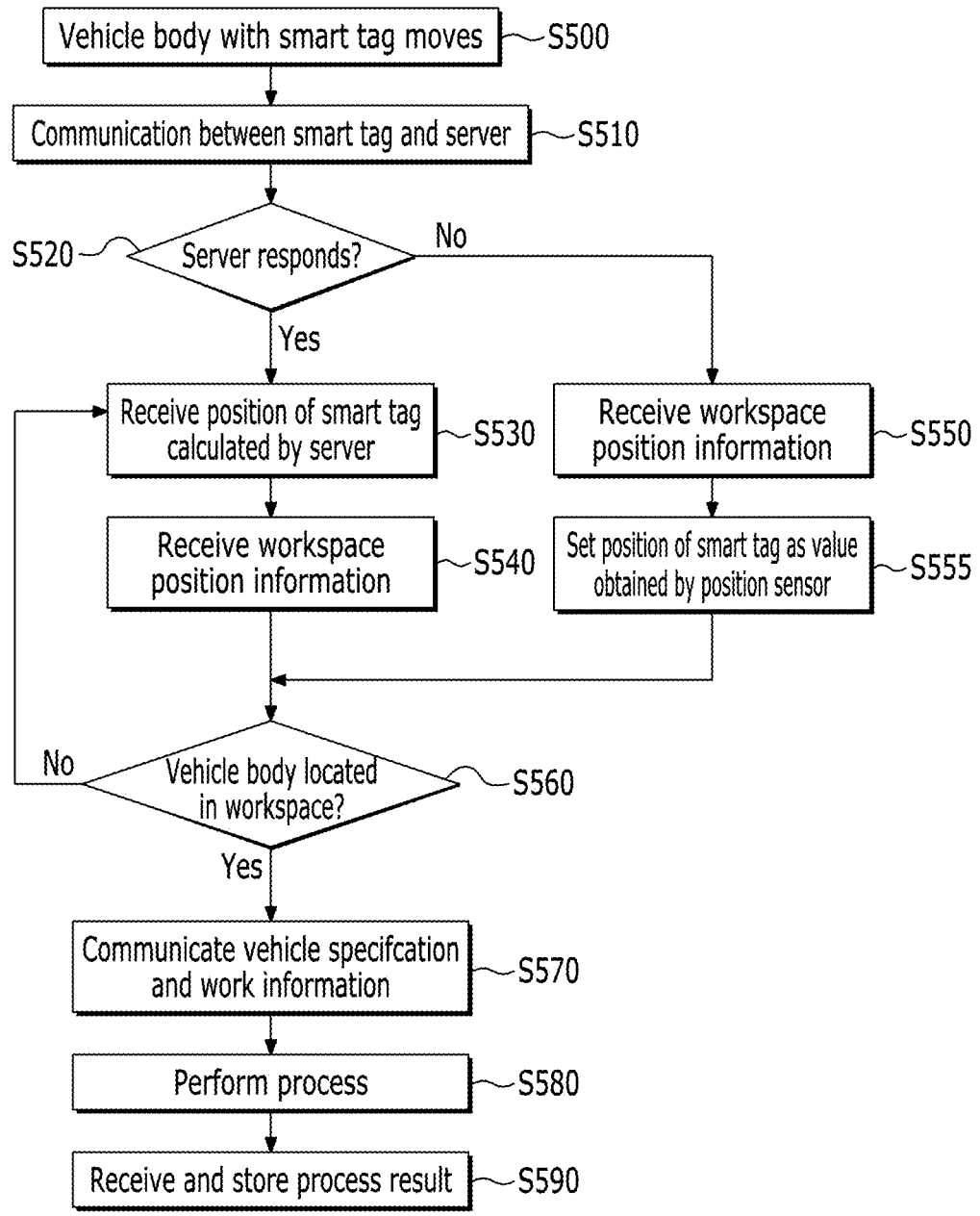
FIG. 4 is a flowchart showing a method of how vehicle information is conceived and process result is stored according to an embodiment of the present invention.

FIG. 4 is a flowchart showing a method of how vehicle information is conceived and process result is stored according to an embodiment of the present invention.

Firstly at step S500, the vehicle body 120 attached with the smart tag 220 moves along a predetermined work path.

At step S510, the smart tag 220 communicates with the main transceiver 210 through the position measurement transmitter 320 and the wireless communication transceiver 330. At step S510, the controller 300 of the smart tag 220 may send a request to calculate vehicle position to the server 200 by activating the position measurement transmitter 320 to send a position measurement signal.

Subsequently at step S520, the controller 300 determines whether the server 200 responds. When the server 200 responds, step S530 is performed, and when the server 200 does not respond, step 550 is performed.

At step S530, the server 200 calculates position value of the smart tag 220 based on signal strength of the signal received from the position measurement transmitter 320 of the smart tag 220. The server 200 may also refer to information from the position sensor 350 received from the smart tag 220, of which a calculation may be obviously designed appropriately for an intended purpose. It is notable that the position of the smart tag 220 implies the position of the vehicle body 120. The server 200 sends the calculated position value of the smart tag 220 through the main transceiver 210, and the smart tag 220 receives the position value through the wireless communication transceiver 330.

That is, the smart tag 220 may precisely update the position of the vehicle body 120 by communicating with the server 200.

At the step S540, the server 200 also calculates location value of a current workspace. The server 200 may already store the location value in an installed memory and merely retrieve the location value from the memory.

Subsequently at step S540, the server 200 sends the location value of the workspace through the main transceiver 210, and the smart tag 220 receives the location value through the wireless communication transceiver 330.

At step S550, in the case that the server 200 does not respond, the main transceiver 210 transmits the location value of the current workspace, and the smart tag 220 receives the location value of the workspace. Even if the server 200 does not respond, e.g., because of malfunctioning or sleeping, it may be configured that the main transceiver 210 located at specific workspaces may periodically send a corresponding location value of the workspace.

After receiving the location value of the current workspace without receiving a response of the server 200, the smart tag 220 calculates, at step S555, the position of the vehicle body 120 using the position sensor 350, and assigns the calculated vehicle position value to the tag position value. That is, although the calculated position value is not a precise value received from the server 200, the smart tag 220 always updates the vehicle position using the position sensor 350.

As described above, the position sensor 350 may be a physical sensor of an acceleration sensor type, and in this case, the position sensor 350 may generate a signal containing acceleration and direction. Thus, the smart tag 220 may calculate a current position using data from the position sensor 350 while moving from a previous workspace to a current workspace.

At step S560, the smart tag 220 determines whether the vehicle body 120 has entered a predetermined workspace.

When the vehicle body 120 has not entered the workspace, the processes of S520 to S555 are resumed until the vehicle body 120 has entered the workspace.

At step S570, when the vehicle body 120 has entered the workspace, the smart tag 220 sends information such as vehicle body specification to the server 200, and the server 200 sends process information to the smart tag 220. The process information includes e.g., work to be performed on the vehicle body, e.g., attachment of doors, filling fluids, etc.

At step S580, the process information is display on the specification display 390 through communication between the server 200, the smart tag 220, and the specification display 390, and workers may check and perform specific assigned works.

At step S590, the server 200 receives a process result, e.g., by manually inputting of the workers, and sends the process result to the smart tag 220. The smart tag 220 stores the process result in the memory 340.

The memory 340 may store and update position information of the vehicle body, vehicle body code information, specification information of parts to be assembled, fastening torque information for parts to be assembled, fluid quantity information to be inserted or actually inserted into the vehicle, and inspection result information. The fluid includes engine oil, transmission fluid, brake fluid, steering oil, coolant, and washer liquid.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While this invention has been described in connection with embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

120: vehicle body
210: main transceiver
220: smart tag
200: server
300: controller
310: battery
320: position measurement transmitter
330: wireless communication transceiver
340: memory
350: position sensor
360: state display
390: specification display

What is claimed is:

1. A smart tag system for a manufacturing a vehicle, comprising:
 a smart tag configured to be attached to a vehicle body and to store vehicle body information;
 a main transceiver configured to wirelessly communicate with the smart tag; and
 a server configured to communicate with the smart tag via the main transceiver,
 wherein the smart tag comprises,
  a position measurement transmitter configured to transmit a signal for measurement of a vehicle body position;
  a wireless communication transceiver configured to perform wireless communication with the main transceiver;
  a position sensor configured to sense data for calculating a position of the vehicle body;
  a memory configured to store the vehicle body information;
  a controller configured to control operation of the smart tag; and
  a battery configured to supply electric power of the smart tag,
 wherein the position sensor is an acceleration sensor configured to detect acceleration of a movement of the vehicle body.

2. The smart tag system of claim 1, wherein the server is configured to calculate the vehicle body position based on the signal transmitted from the position measurement transmitter.

3. The smart tag system of claim 1, wherein the smart tag is configured to determine whether the vehicle body has entered a predetermined workspace based on information received from the server or based on data obtained by the position sensor.

4. The smart tag system of claim 1, wherein the controller is configured to store and update the vehicle body position in the memory.

5. The smart tag system of claim 1, wherein:
 the smart tag is configured to send the vehicle body information to the server;
 the server is configured to send process information corresponding to the vehicle body information; and
 the controller is configured to store the received process information in the memory.

6. The smart tag system of claim 1, wherein the server is configured to send process result information to the smart tag, and the smart tag is configured to store the process result information in the memory.

7. The smart tag system of claim 1, wherein the smart tag is configured to send specification information of the vehicle body to the server.

8. The smart tag system of claim 1, wherein the memory is configured to store at least one among position information of the vehicle body, vehicle body code information, specification information of parts to be assembled, fastening torque information for parts to be assembled, fluid quantity information to be inserted or actually inserted into the vehicle, inspection result information.

9. The smart tag system of claim 8, wherein the fluid comprises engine oil, transmission oil, brake fluid, steering oil, coolant, or washer liquid.

10. The smart tag system of claim 1, wherein the smart tag is configured to calculate position of the vehicle body based on data received from the acceleration sensor.

11. The smart tag system of claim 1, wherein when the server does not respond upon a request for vehicle body position information, the controller is configured to use the position of the vehicle body calculated by the position sensor as the vehicle body position.

12. The smart tag system of claim 1, wherein the smart tag further comprises a state display configured to display an operating state of the smart tag by turning on or off or by a displayed color.

13. A smart tag attachable on a vehicle body in a vehicle manufacturing process, the smart tag comprising:
 a position measurement transmitter configured to transmit a signal used for measurement of a vehicle body position;
 a wireless communication transceiver configured to perform wireless communication;
 a position sensor configured to sense data for calculating a position of the vehicle body;
 a memory configured to store data including vehicle body information;
 a controller configured to control an operation of the smart tag; and
 a battery configured to supply electric power of the smart tag,
 wherein the position sensor is an acceleration sensor configured to detect acceleration of a movement of the vehicle body.

14. The smart tag of claim 13, wherein the memory is configured to store at least one among position information of the vehicle body, vehicle body code information, specification information of parts to be assembled, fastening torque information for parts to be assembled, fluid quantity information to be inserted or actually inserted into the vehicle, and inspection result information.

15. The smart tag of claim 13, wherein the controller is configured to compute position of the vehicle body based on data received from the acceleration sensor.

16. The smart tag of claim 13, further comprising a state display configured to display an operating state of the smart tag by turning on or off or by a displayed color.

\* \* \* \* \*